US012782201B2

(12) United States Patent
Li et al.

(10) Patent No.: US 12,782,201 B2
(45) Date of Patent: Nov. 3, 2026

(54) TEMPERATURE GAUGE AND TEMPERATURE GAUGE WITH FLOATING SHELL

(71) Applicant: SHENZHEN COOTWAY TECHNOLOGY CO., LTD., Shenzhen (CN)

(72) Inventors: Daiquan Li, Shenzhen (CN); Ming Li, Shenzhen (CN)

(73) Assignee: SHENZHEN COOTWAY TECHNOLOGY CO., LTD., Shenzhen (CN)

( * ) Notice: Subject to any disclaimer, the term of this patent is extended or adjusted under 35 U.S.C. 154(b) by 366 days.

(21) Appl. No.: 18/422,208

(22) Filed: Jan. 25, 2024

(65) Prior Publication Data

US 2025/0237554 A1 Jul. 24, 2025

(30) Foreign Application Priority Data

Jan. 22, 2024 (CN) ......................... 202420153550.6

(51) Int. Cl.
*G01K 1/14* (2021.01)
*G01K 1/02* (2021.01)

(52) U.S. Cl.
CPC ............... *G01K 1/14* (2013.01); *G01K 1/028* (2013.01)

(58) Field of Classification Search
CPC ................................ G01K 1/14; G01K 1/028
USPC ................................................. 374/208, 141
See application file for complete search history.

(56) References Cited

U.S. PATENT DOCUMENTS 5,169,236 A * 12/1992 Iest ........................ G01K 13/00 374/E1.008
6,238,553 B1 * 5/2001 Lin ........................ B01F 21/22 210/85
2005/0220169 A1 * 10/2005 McGowan-Scanlon .................... G01N 33/1886 374/E1.018
2023/0184598 A1 * 6/2023 Zhang ...................... G01K 1/08 374/208

FOREIGN PATENT DOCUMENTS

CN 208704893 U * 4/2019
CN 112254843 A * 1/2021 ............ G01K 13/00
CN 212645931 U * 3/2021
CN 115290841 A * 11/2022 ......... G01N 33/1806
KR 20200095780 A * 8/2020 ............ A63H 23/10

OTHER PUBLICATIONS

Translation of CN208704893U (Year: 2019).*

* cited by examiner

*Primary Examiner* — Mirellys Jagan

(57) ABSTRACT

A temperature gauge includes a shell, a temperature sensing device and a display device. An accommodating chamber is arranged in the shell. At least a portion of an upper part of the shell is transparent. A control device is arranged inside the accommodating chamber. The temperature sensing device is arranged inside the accommodating chamber and is at least partially threaded out of a bottom of the shell. The temperature sensing device is electrically connected to the control device. The display device is arranged inside the accommodating chamber. The display device is electrically connected to the control device and faces the transparent portion of the upper part of the shell. And the control device receives the electrical signal and controls the display device to display a temperature.

18 Claims, 13 Drawing Sheets

TEMPERATURE GAUGE AND TEMPERATURE GAUGE WITH FLOATING SHELL

CROSS-REFERENCE TO RELATED APPLICATIONS

The application claims priority of Chinese patent application CN202420153550.6, filed on Jan. 22, 2024, which is incorporated herein by reference in its entireties.

TECHNICAL FIELD

The present disclosure relates to the technical field of temperature gauges, and in particular, to a temperature gauge and a temperature gauge with a floating shell.

BACKGROUND

Swimming pools are places where people swim. People can do activities or competitions in the swimming pools. Thermostatic swimming pools are particularly popular. In order to detect a water temperature in the swimming pool, people usually use a temperature gauge.

At present, the existing temperature gauges for swimming pools on the market mostly include two types: temperature gauges that float on a water surface or temperature gauges that are placed in water. The temperature gauges that float on the water surface are particularly popular because temperatures are easily observed. The existing floating temperature gauge for the swimming pool usually includes a sealed floating chamber, a temperature probe, and the like. In order to ensure the sealing performance of the product, these components are usually integrated, so that the shape is monotonous. Since people often prefer floating temperature gauges for swimming pools with different shapes, and the appearances of the existing products cannot be changed, these products are monotonous.

For this purpose, the present disclosure provides a temperature gauge and a temperature gauge with a floating shell, which can effectively solve the above problems. The temperature gauge is simple in structure and convenient to assemble and disassemble, and the appearance of the product can be conveniently changed.

SUMMARY

In order to overcome the shortcomings of the prior art, the present disclosure provides a temperature gauge. The temperature gauge is simple in structure and convenient to assemble and disassemble, and the appearance of the product can be conveniently changed.

The present disclosure provides a temperature gauge, including:

a shell, wherein an accommodating chamber is arranged in the shell; at least a portion of an upper part of the shell is transparent; a control device is arranged inside the accommodating chamber; the shell is configured to be detachably connected to a floating shell and floats on a water surface under the action of buoyancy of the floating shell;

a temperature sensing device, wherein the temperature sensing device is arranged inside the accommodating chamber and is at least partially threaded out of a bottom of the shell; the temperature sensing device is electrically connected to the control device; the temperature sensing device is configured to be immersed in water to detect a water temperature to generate an electrical signal and transmit the electrical signal to the control device; and a display device, wherein the display device is arranged inside the accommodating chamber; the display device is electrically connected to the control device and faces the transparent portion of the upper part of the shell; and the control device receives the electrical signal and controls the display device to display a temperature.

As the improvement of the present disclosure, the bottom of the shell extends downwards to form a protruding insertion part; a tail end of the insertion part is provided with a mounting hole communicated to the accommodating chamber; and a detection end of the temperature sensing device is threaded out along the mounting hole.

As the improvement of the present disclosure, a limiting block is arranged in the mounting hole in a protruding manner, and an end surface of the detection end face of the temperature sensing device is abutted to the limiting block.

As the improvement of the present disclosure, the temperature gauge further includes a first sealing ring, wherein a first sealing groove is arranged on the end surface of the detection end face of the temperature sensing device; the first sealing ring is arranged in the first sealing groove; and the limiting block is abutted to a surface of the first sealing ring.

As the improvement of the present disclosure, protective flaps are arranged at a tail end of the insertion part in a protruding manner, and the protective flaps are arranged around the detection end of the temperature sensing device.

As the improvement of the present disclosure, the temperature gauge further includes a second sealing ring, wherein the shell includes an upper shell and a lower shell; the upper shell is provided with a second sealing groove; second sealing ring is inserted into the second sealing groove; the lower shell is connected to the upper shell and is abutted to the second sealing ring; and the accommodating chamber is formed between the upper shell and the lower shell.

As the improvement of the present disclosure, the temperature gauge further includes a button assembly, wherein a button hole is arranged on a lower surface of the shell; the button assembly is hermetically inserted into the button hole; and the button assembly is electrically connected to the control device.

As the improvement of the present disclosure, the button assembly includes a button control board and a silica gel button cap; the button control board is connected to the shell; an edge of the silica gel button cap is hermetically connected to the shell; and a middle part of the silica gel button cap is in contact with an electrical contact on the button control board.

As the improvement of the present disclosure, the temperature gauge further includes a solar panel, wherein the solar panel is arranged at a top of the accommodating chamber and faces the transparent portion of the upper part of the shell; and the solar panel is electrically connected to the control device.

As the improvement of the present disclosure, an opening is arranged in a middle part of the solar panel; and the opening directly faces the display device and is configured to allow light to pass.

As the improvement of the present disclosure, the temperature gauge further includes a supporting shell; the supporting shell is arranged inside the accommodating chamber; the control device is connected to the supporting shell; and the solar panel is arranged on an upper surface of the supporting shell.

As the improvement of the present disclosure, the temperature gauge further includes a batter; and the battery is arranged at the middle part of the accommodating chamber and is electrically connected to the control device.

As the improvement of the present disclosure, a threading hole is further arranged on a surface of the lower shell, and the threading hole is configured to allow a wire body to pass.

The present disclosure also provides a temperature gauge with a floating shell, including:

- a floating shell, wherein the floating shell is provided with a sealed floating chamber and an insertion space;
- a shell, wherein an accommodating chamber is arranged in the shell; at least a portion of an upper part of the shell is transparent; a control device is arranged inside the accommodating chamber; the shell is configured to be detachably connected and inserted to the insertion space and floats on a water surface under the action of buoyancy of the floating shell;
- a temperature sensing device, wherein the temperature sensing device is arranged inside the accommodating chamber and is at least partially threaded out of a bottom of the shell; the temperature sensing device is electrically connected to the control device; the temperature sensing device is configured to be immersed in water to detect a water temperature to generate an electrical signal and transmit the electrical signal to the control device; and
- a display device, wherein the display device is arranged inside the accommodating chamber; the display device is electrically connected to the control device and faces the transparent portion of the upper part of the shell; and the control device receives the electrical signal and controls the display device to display a temperature.

As the improvement of the present disclosure, the bottom of the shell extends downwards to form a protruding insertion part; a tail end of the insertion part is provided with a mounting hole communicated to the accommodating chamber; and a detection end of the temperature sensing device is threaded out along the mounting hole.

As the improvement of the present disclosure, a limiting block is arranged in the mounting hole in a protruding manner, and an end surface of the detection end face of the temperature sensing device is abutted to the limiting block.

As the improvement of the present disclosure, the temperature gauge with the floating shell further includes a first sealing ring, wherein a first sealing groove is arranged on the end surface of the detection end face of the temperature sensing device; the first sealing ring is arranged in the first sealing groove; and the limiting block is abutted to a surface of the first sealing ring.

As the improvement of the present disclosure, a protective flap is arranged at a tail end of the insertion part in a protruding manner, and the protective flap is arranged around the detection end of the temperature sensing device.

As the improvement of the present disclosure, the temperature gauge with the floating shell further includes a second sealing ring, wherein the shell includes an upper shell and a lower shell; the upper shell is provided with a second sealing groove; second sealing ring is inserted into the second sealing groove; the lower shell is connected to the upper shell and is abutted to the second sealing ring; and the accommodating chamber is formed between the upper shell and the lower shell.

As the improvement of the present disclosure, the temperature gauge with the floating shell further includes a button assembly, wherein a button hole is arranged on a lower surface of the shell; the button assembly is hermetically inserted into the button hole; and the button assembly is electrically connected to the control device.

As the improvement of the present disclosure, the button assembly includes a button control board and a silica gel button cap; the button control board is connected to the shell; an edge of the silica gel button cap is hermetically connected to the shell; and a middle part of the silica gel button cap is in contact with an electrical contact on the button control board.

As the improvement of the present disclosure, the temperature gauge with the floating shell further includes a solar panel, wherein the solar panel is located at a top of the accommodating chamber and faces the transparent portion of the upper part of the shell; and the solar panel is electrically connected to the control device.

As the improvement of the present disclosure, an opening is arranged in a middle part of the solar panel; and the opening directly faces the display device and is configured to allow light to pass.

As the improvement of the present disclosure, the temperature gauge with the floating shell further includes a supporting shell; the supporting shell is arranged inside the accommodating chamber; the control device is connected to the supporting shell; and the solar panel is arranged on an upper surface of the supporting shell.

As the improvement of the present disclosure, the temperature gauge with the floating shell further includes a batter; and the battery is arranged at the middle part of the accommodating chamber and is electrically connected to the control device.

As the improvement of the present disclosure, a threading hole is further arranged on a surface of the lower shell, and the threading hole is configured to allow a wire body to pass.

The present disclosure has the following beneficial effects. By the arrangement of the above structure, during use, the shell is connected to the floating shell. When the two shells are placed in the water, the shell floats on the water surface under the action of the buoyancy of the floating shell. Moreover, a user can freely replace the floating shell, so that the product has different appearances and is more diverse and aesthetically pleasing. The temperature sensing device is threaded out along the bottom of the shell and is immersed into liquid, which can effectively measure the water temperature and generate the electrical signal. The electrical signal is transmitted to the control device. The control device controls the display device to display the temperature, and a display surface of the display device faces the transparent portion of the upper part of the shell. The user can observe, through the transparent portion of the upper part of the shell, the temperature displayed by the display device, making it convenient for the user to read temperature parameters.

BRIEF DESCRIPTION OF THE DRAWINGS

In order to explain the technical solutions of the embodiments of the present disclosure more clearly, the following will briefly introduce the accompanying drawings used in the embodiments. The drawings in the following description are only some embodiments of the present disclosure. Those of ordinary skill in the art can obtain other drawings based on these drawings without creative work.

The present disclosure is further described below in detail in combination with the accompanying drawings and embodiments.

DETAILED DESCRIPTION OF THE EMBODIMENTS

Figure 1:
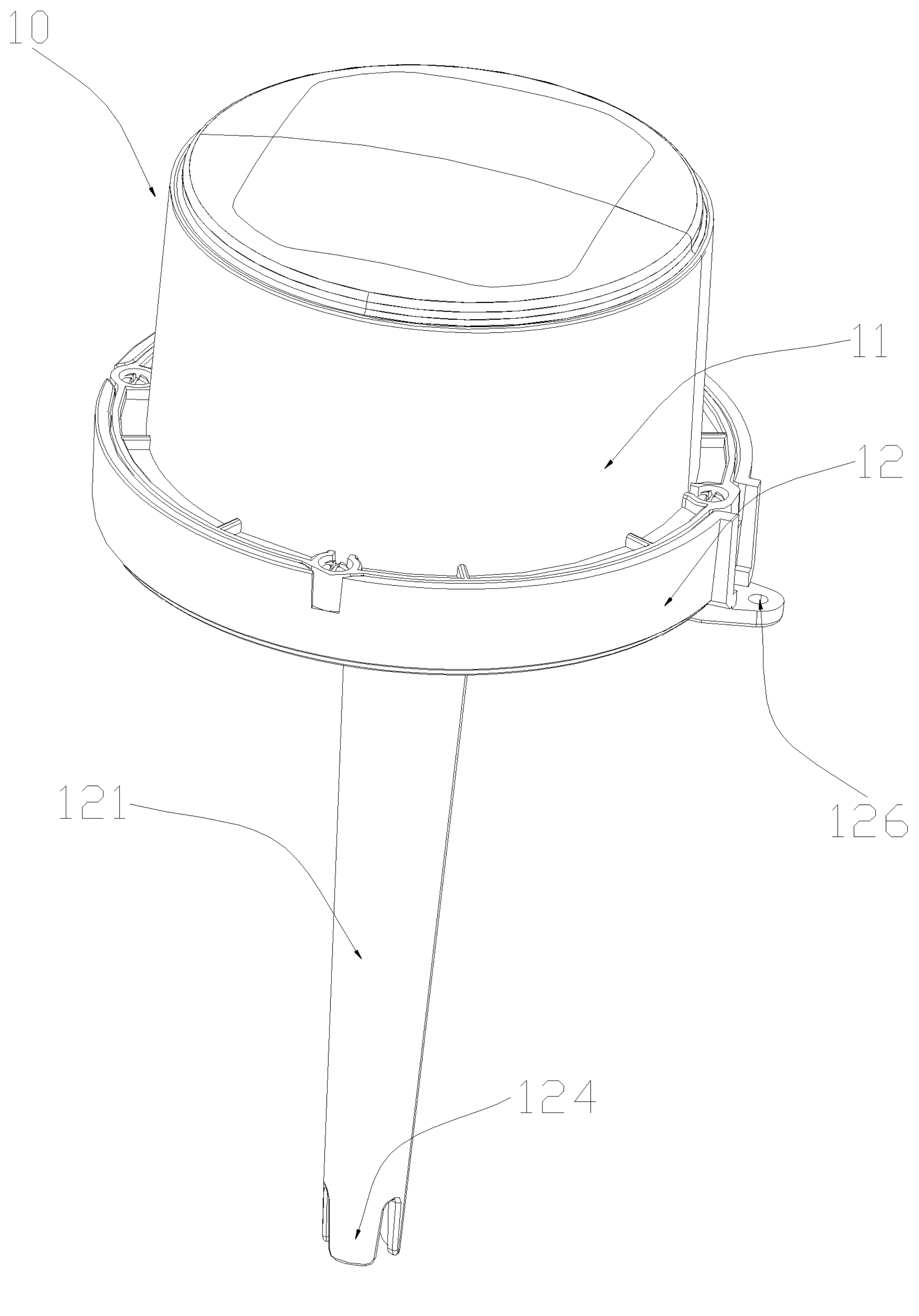
FIG. 1 is a schematic diagram of an entire structure in an angle according to a first embodiment of the present disclosure.
Figure 2:
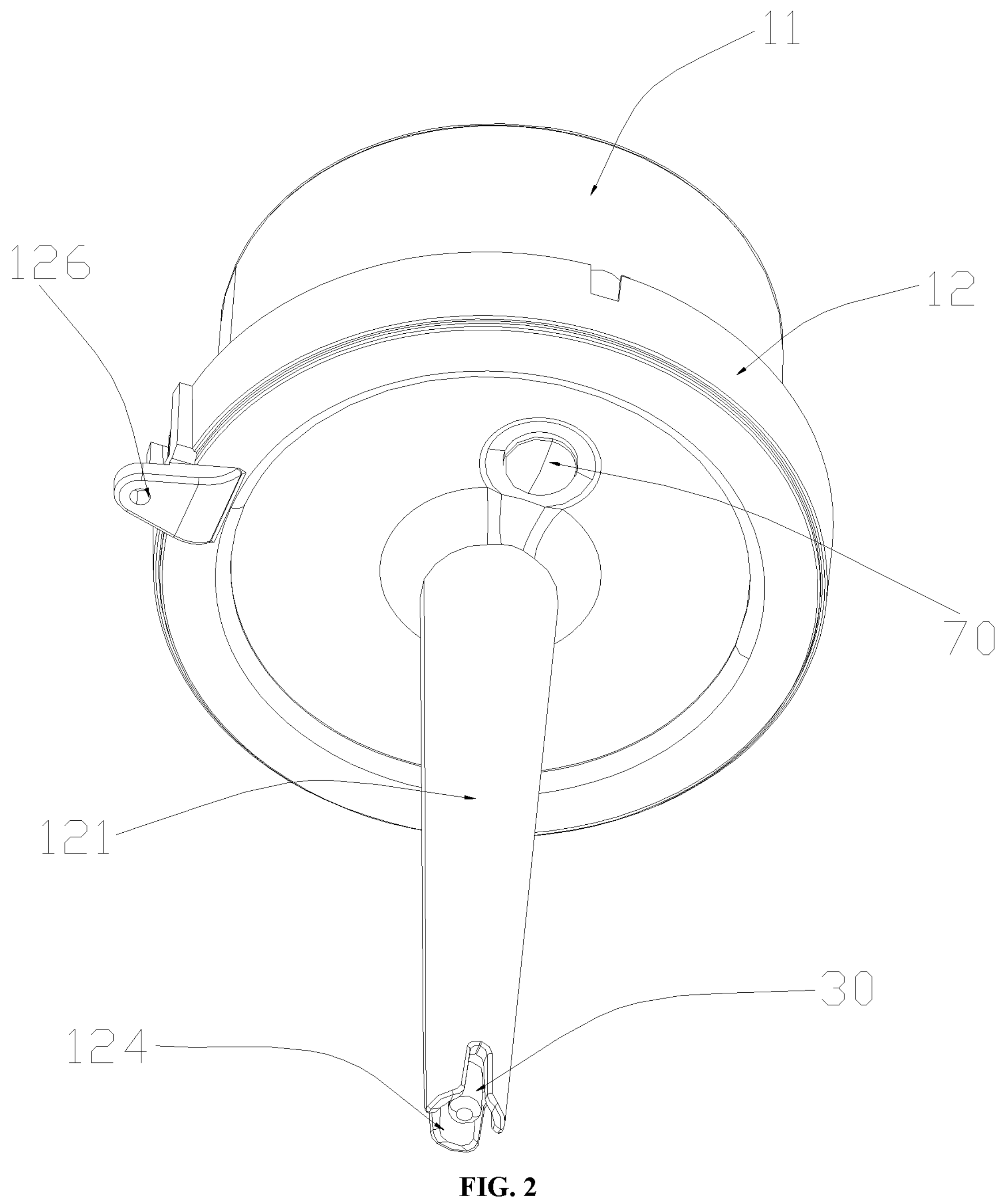
FIG. 2 is a schematic diagram of an entire structure in another angle according to a first embodiment of the present disclosure.
Figure 3:
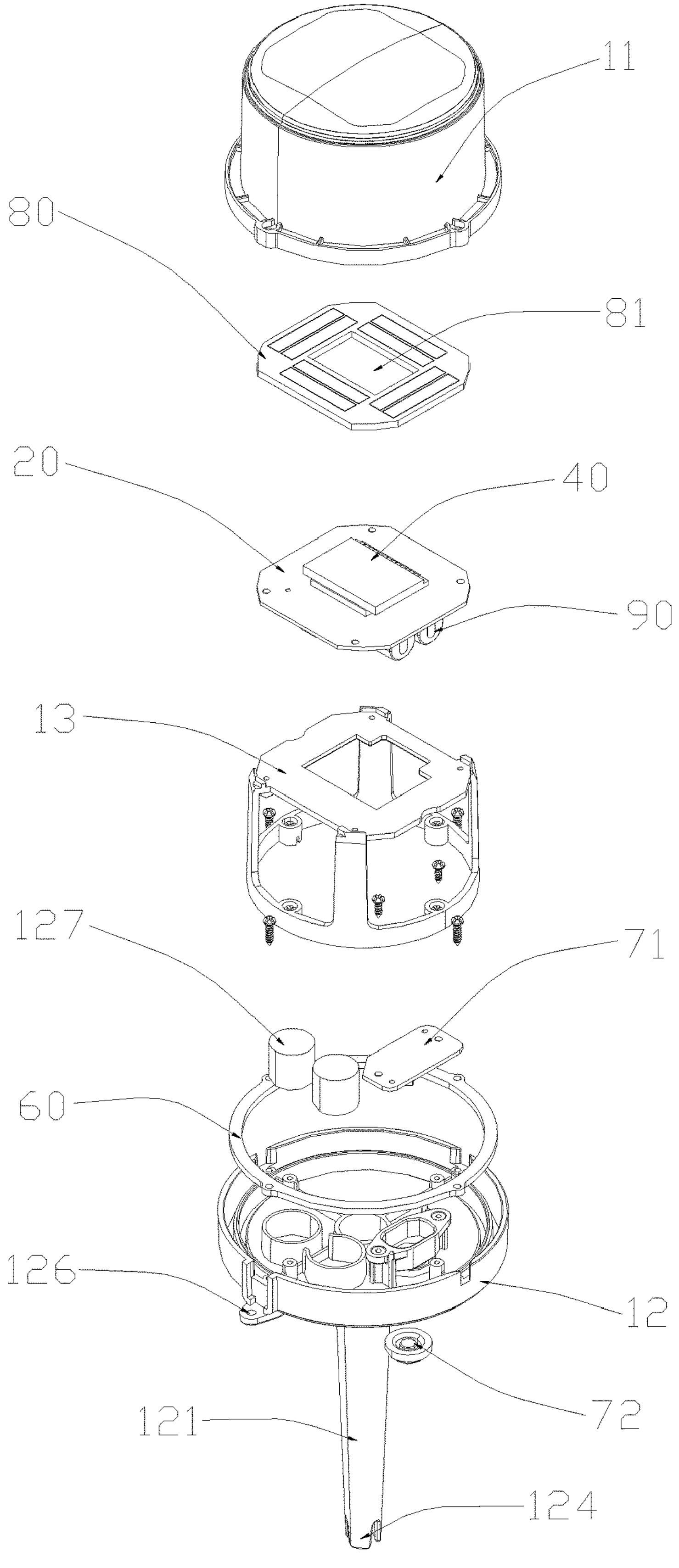
FIG. 3 is a schematic diagram of an exploded structure in an angle according to a first embodiment of the present disclosure.
Figure 4:
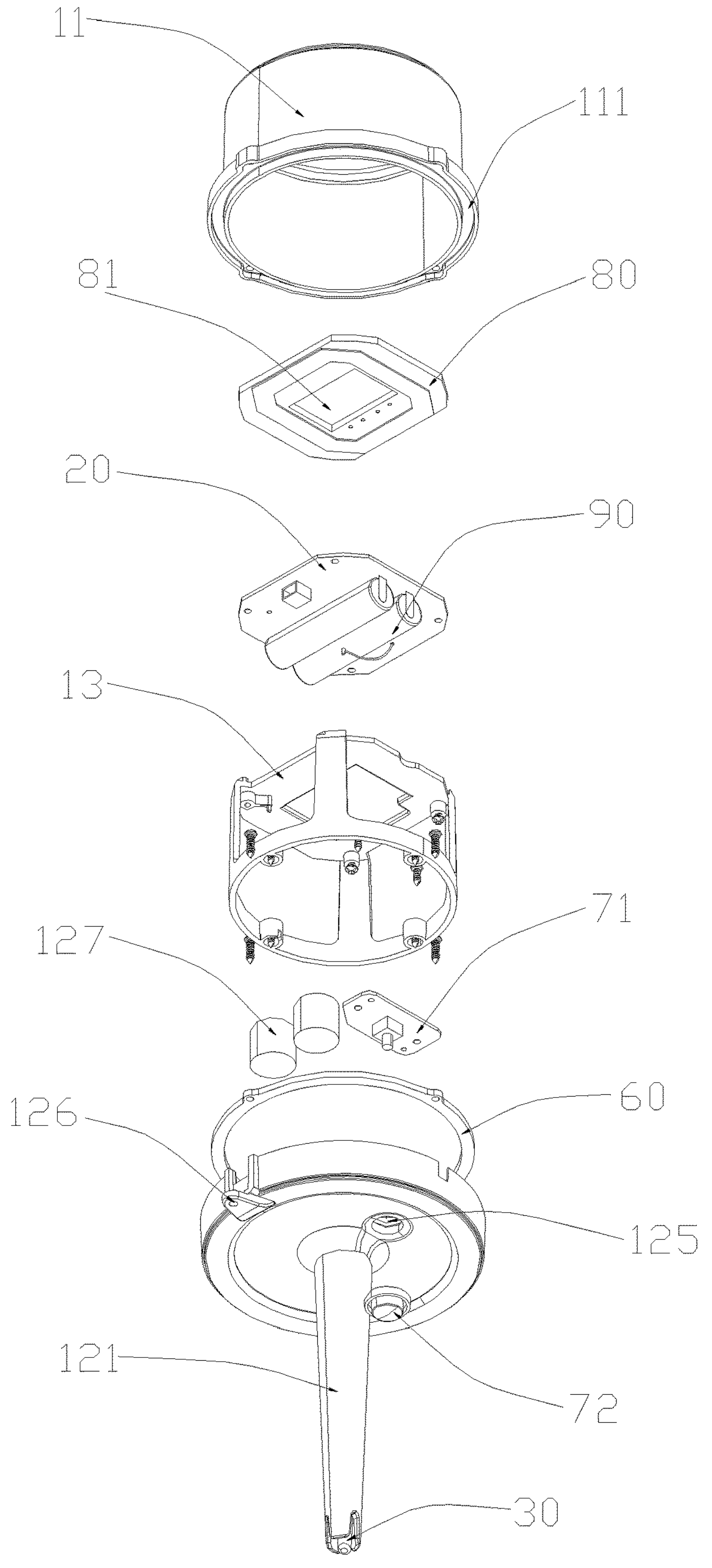
FIG. 4 is a schematic diagram of an exploded structure in another angle according to a first embodiment of the present disclosure.
Figure 5:
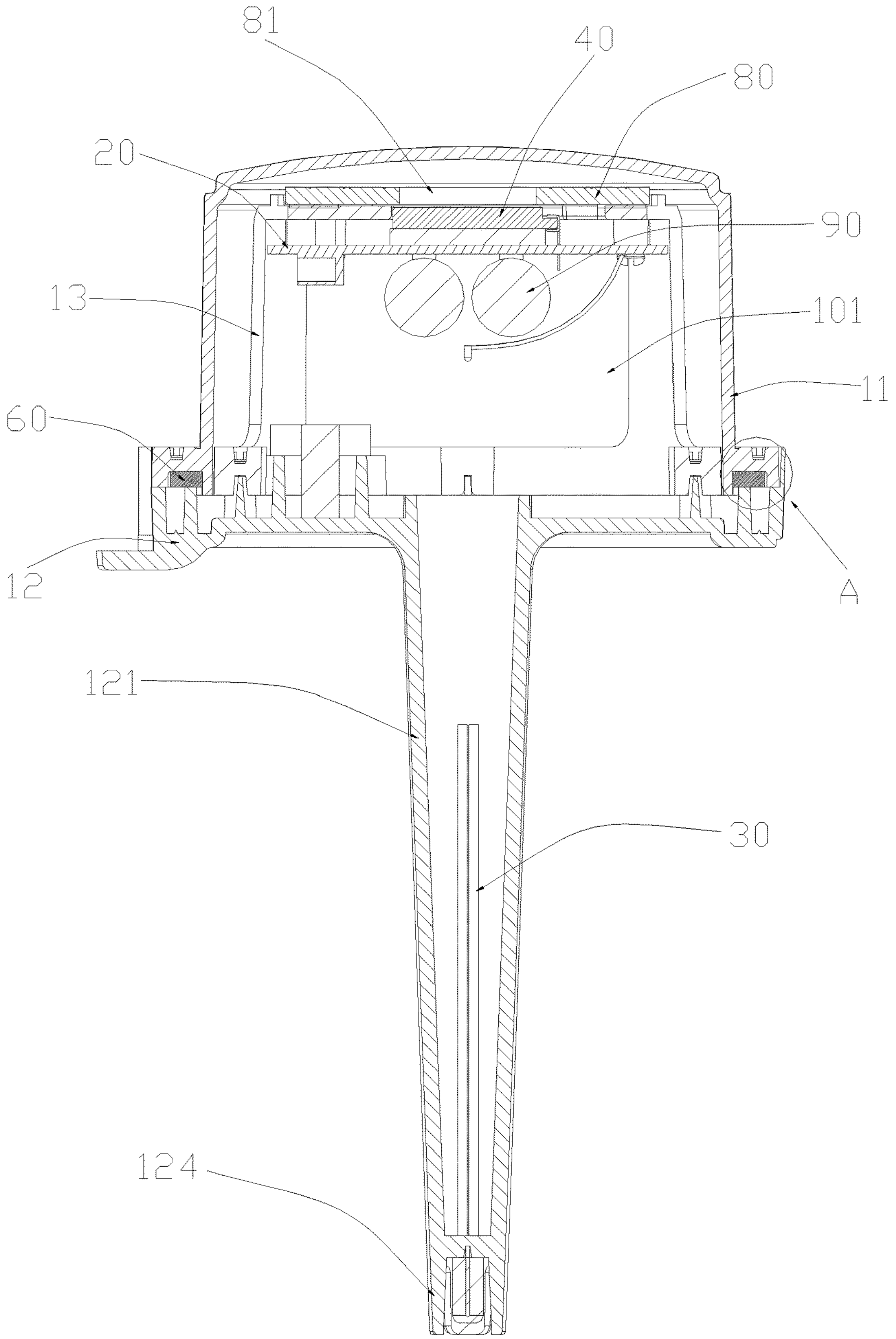
FIG. 5 is a schematic diagram of a cross-sectional structure in a first direction according to a first embodiment of the present disclosure.
Figure 6:
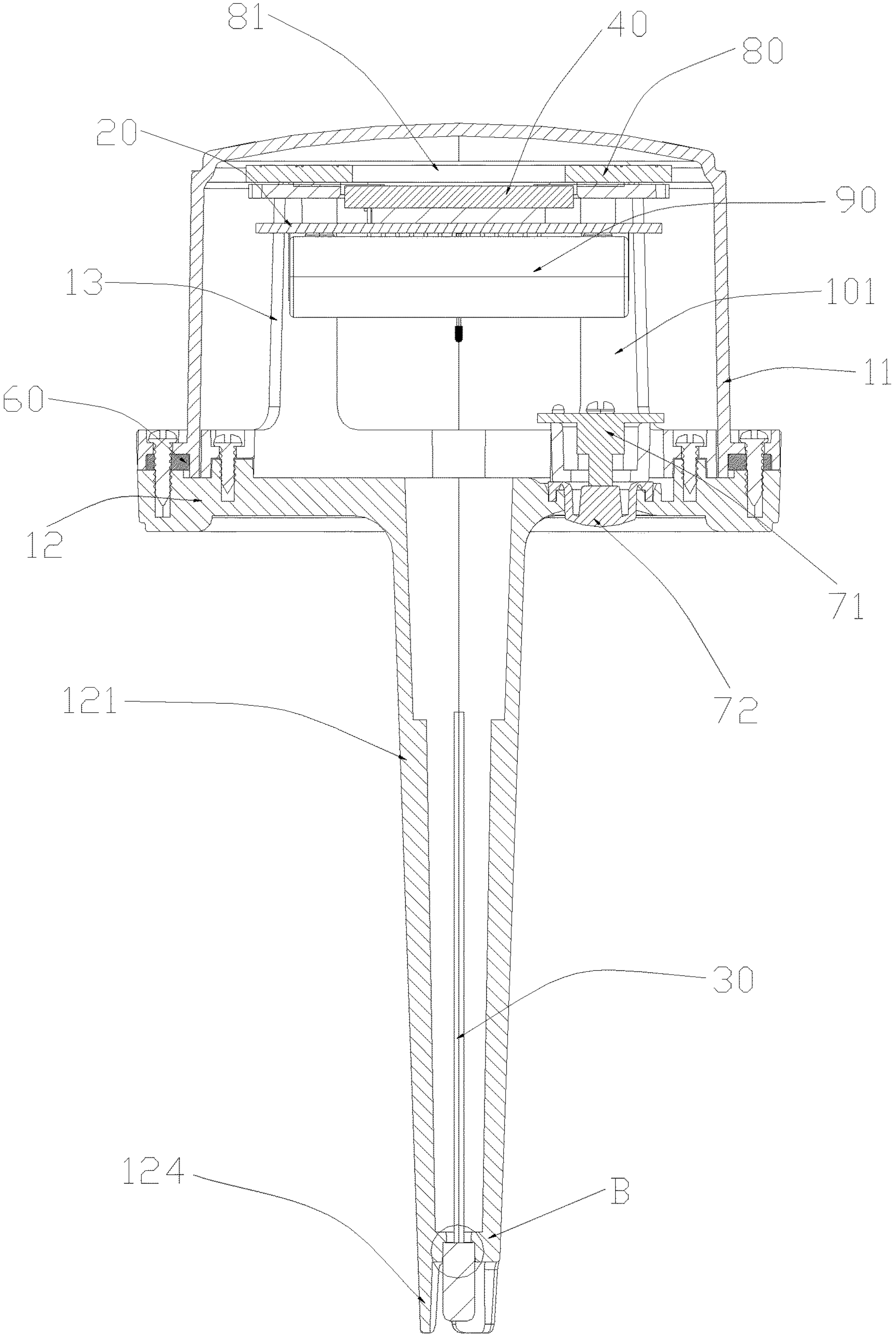
FIG. 6 is a schematic diagram of a cross-sectional structure in a second direction according to a first embodiment of the present disclosure.
Figure 7:
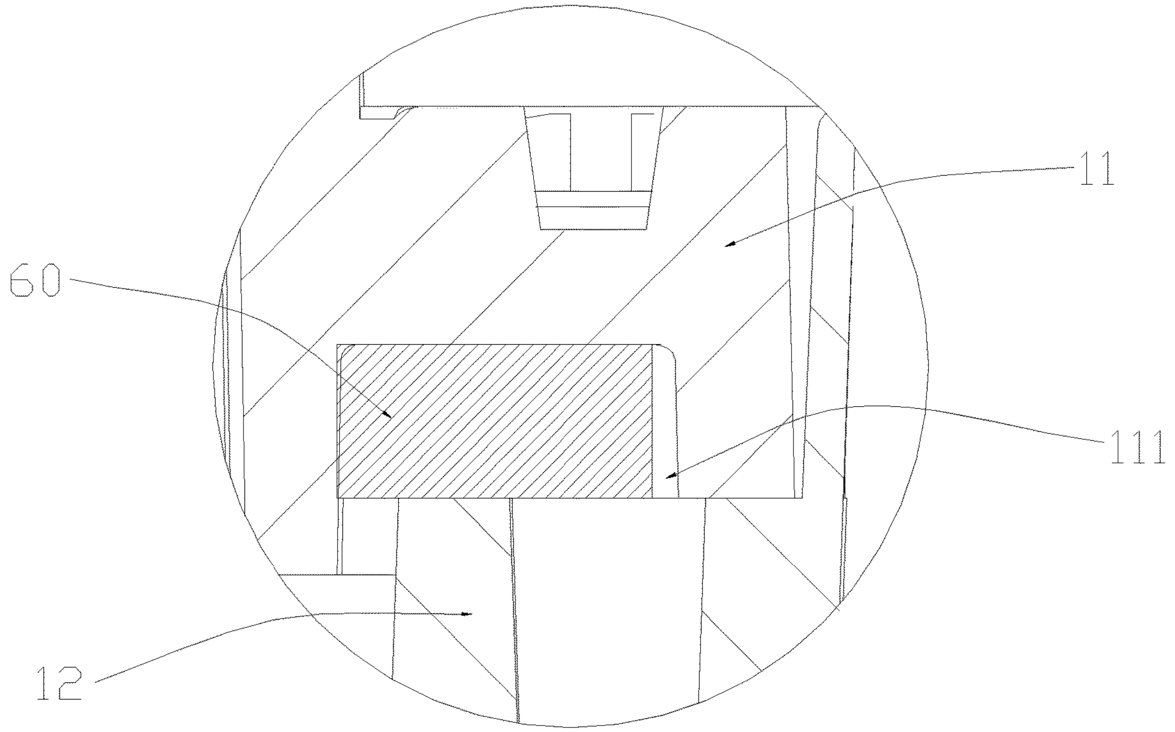
FIG. 7 is an enlarged view of circle A in FIG. 5.
Figure 8:
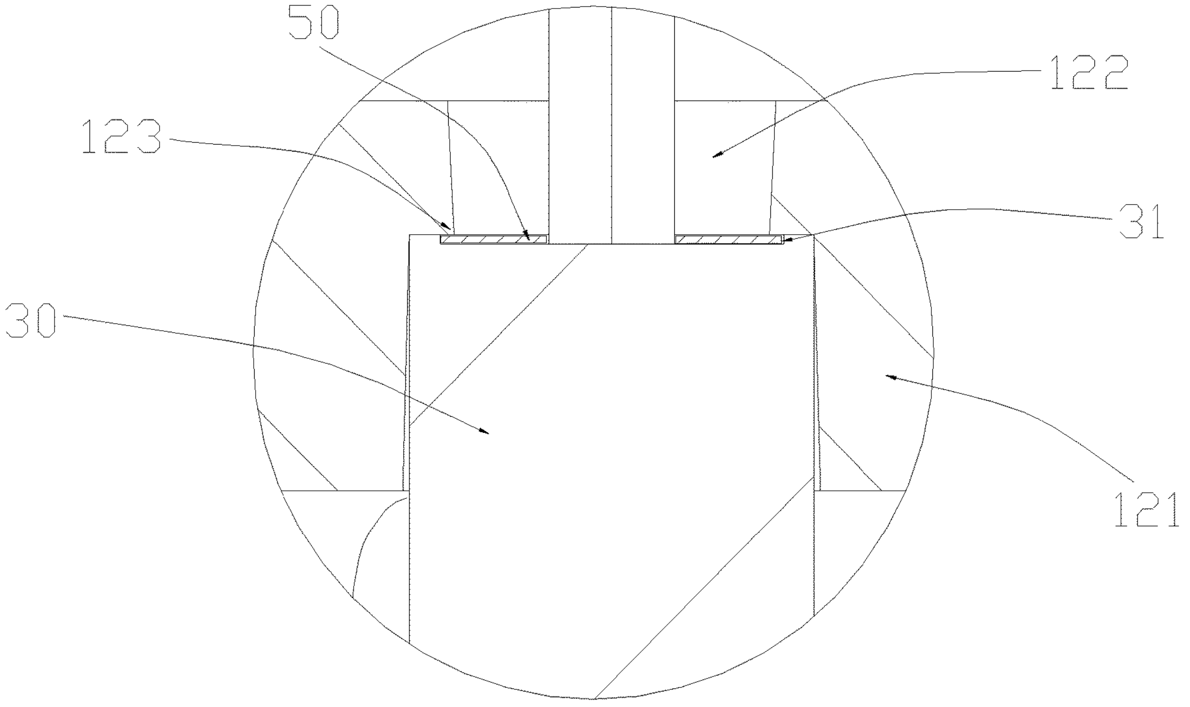
FIG. 8 is an enlarged view of circle B in FIG. 6.
Figure 9:
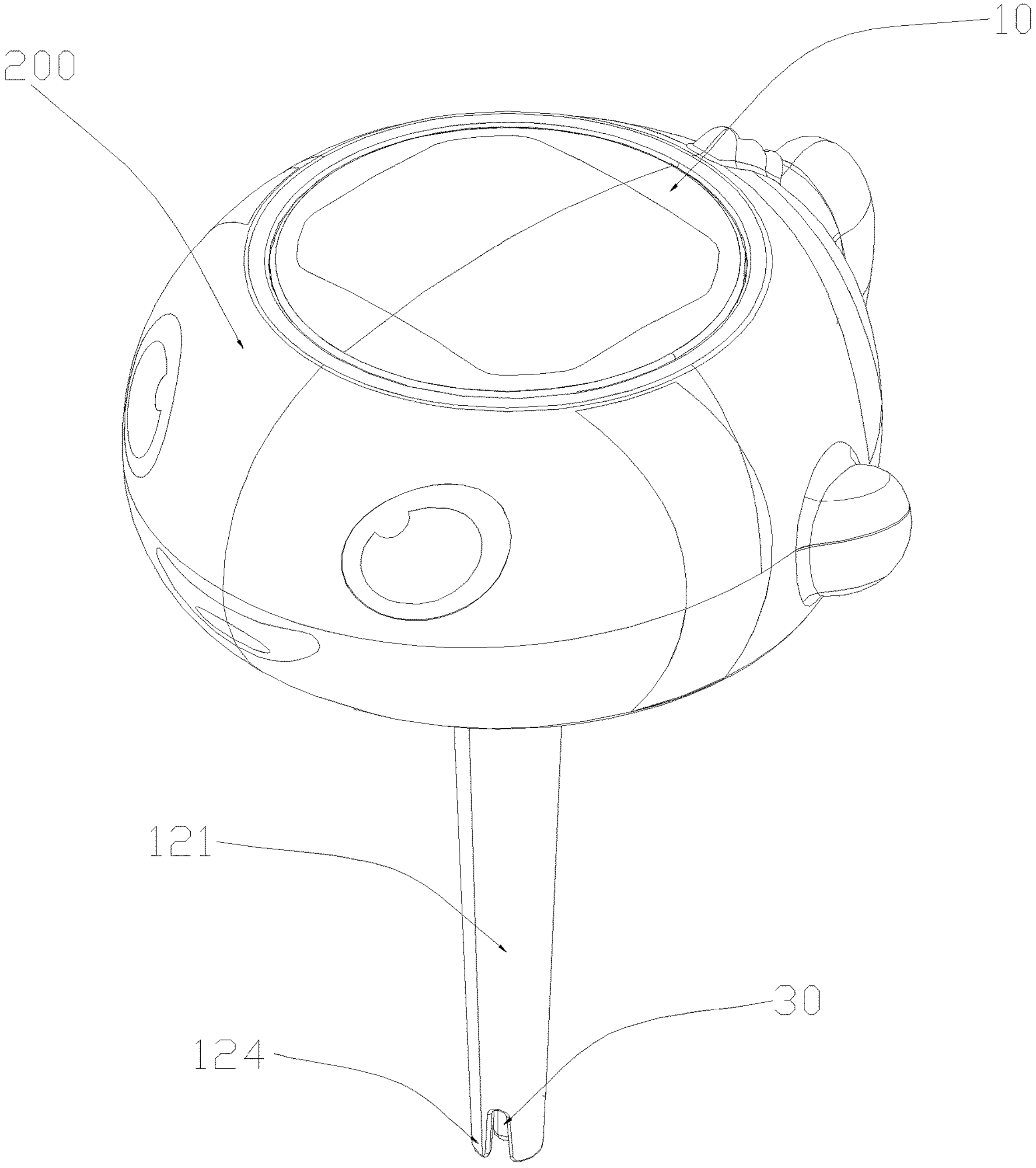
FIG. 9 is a schematic diagram of an entire structure according to a second embodiment of the present disclosure.
Figure 10:
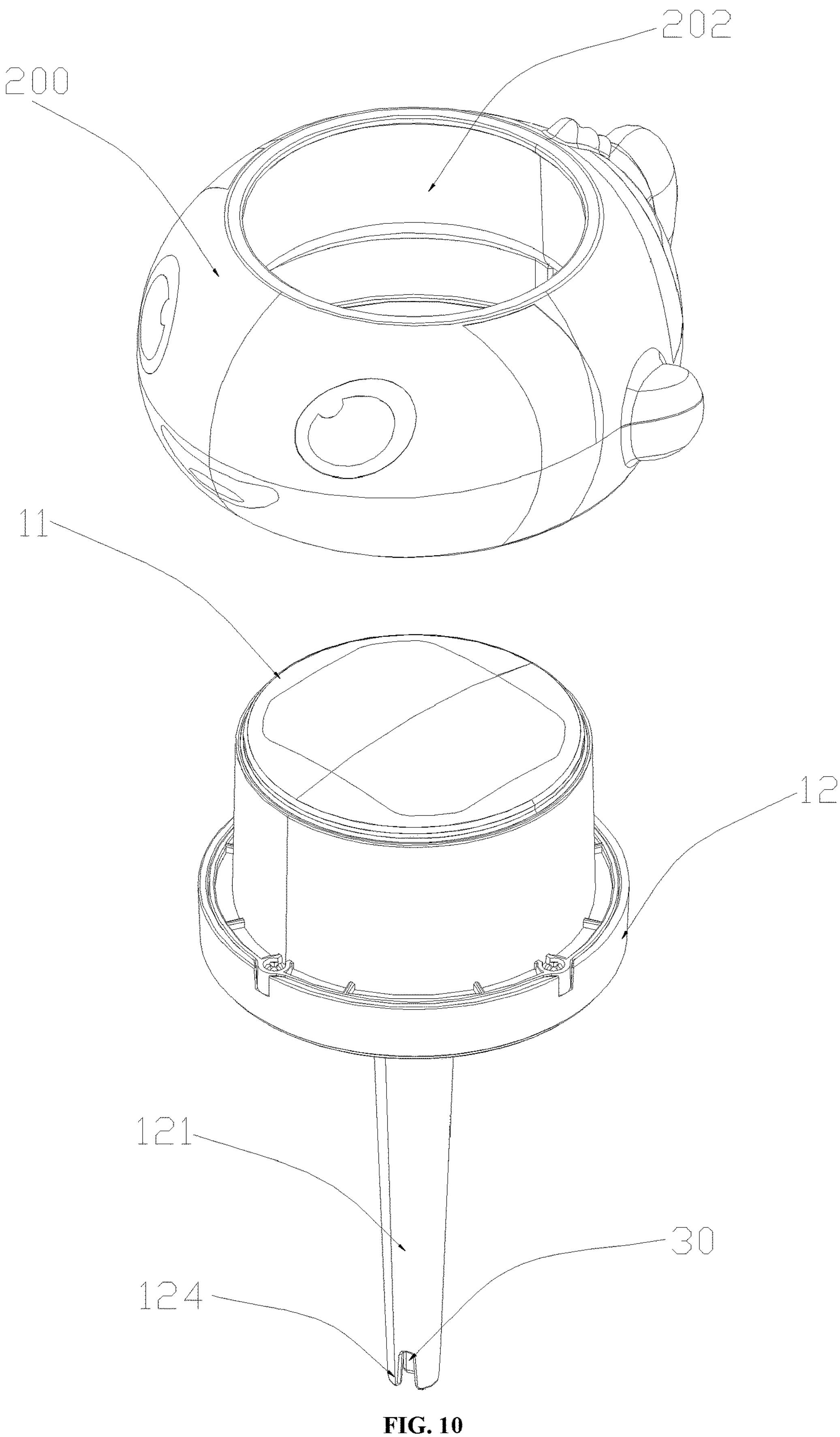
FIG. 10 is a schematic diagram of an exploded structure according to a second embodiment of the present disclosure.
Figure 11:
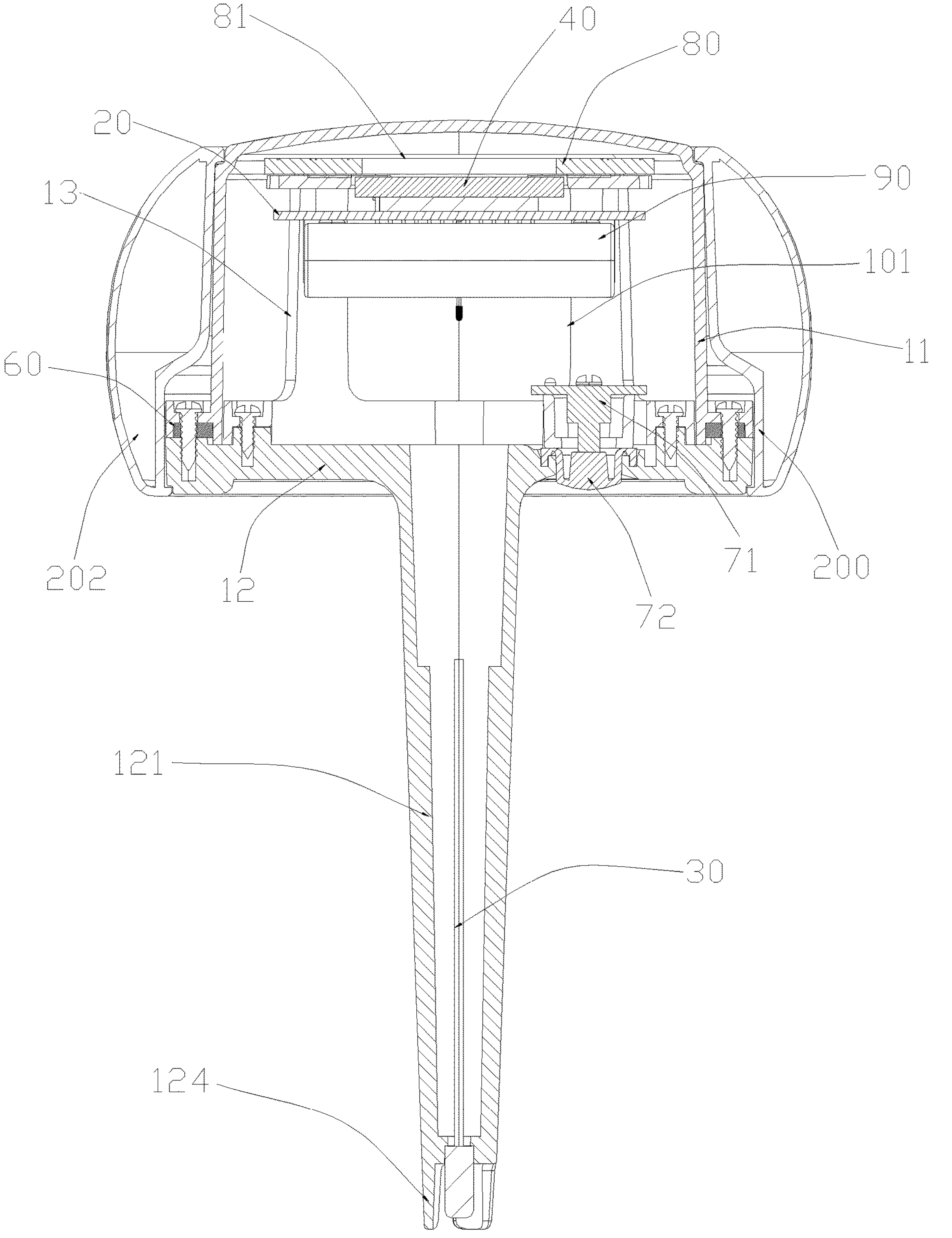
FIG. 11 is a cross-sectional view in a second direction according to a second embodiment of the present disclosure.
Figure 12:
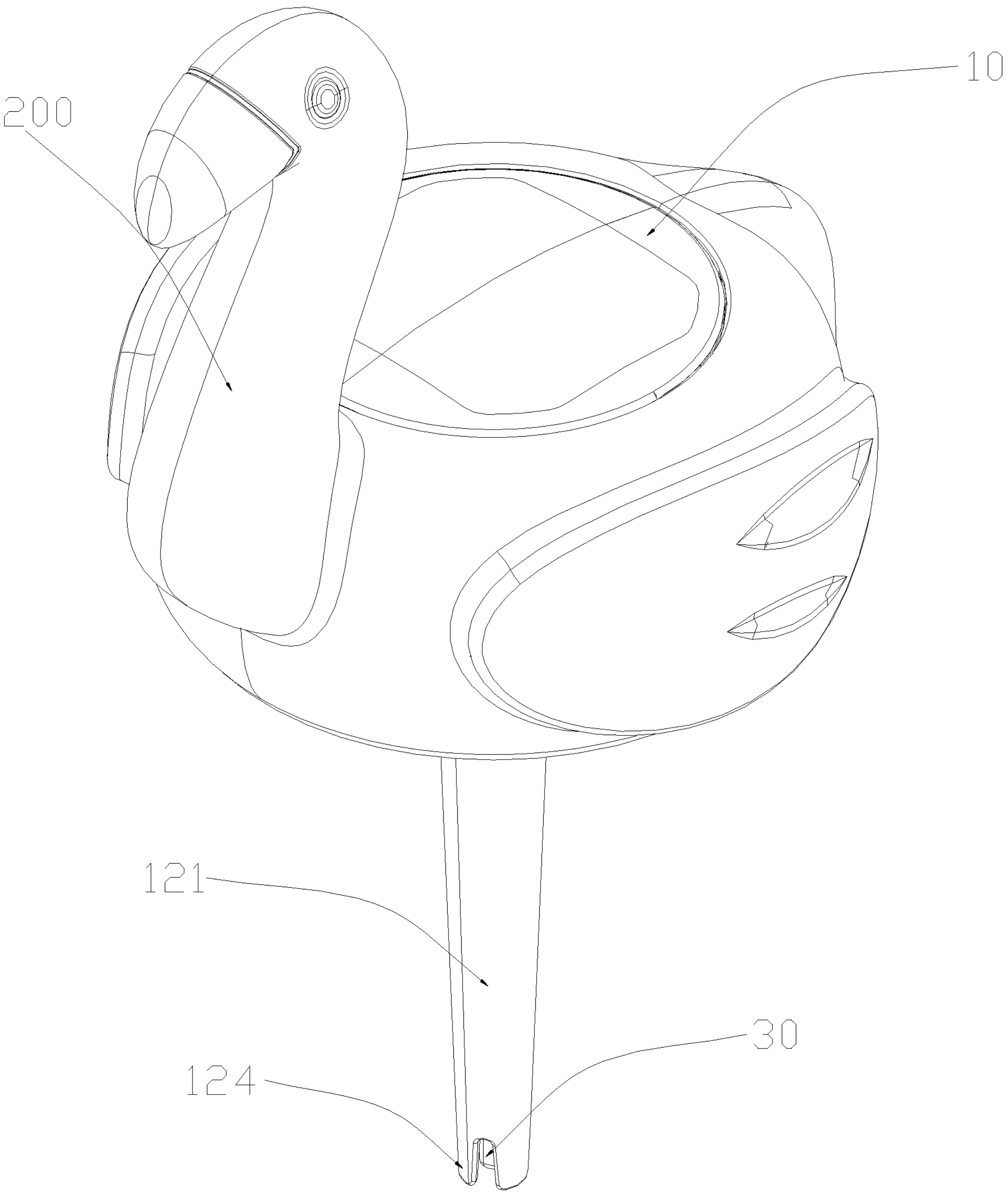
FIG. 12 is a schematic diagram of an entire structure according to a third embodiment of the present disclosure.
Figure 13:
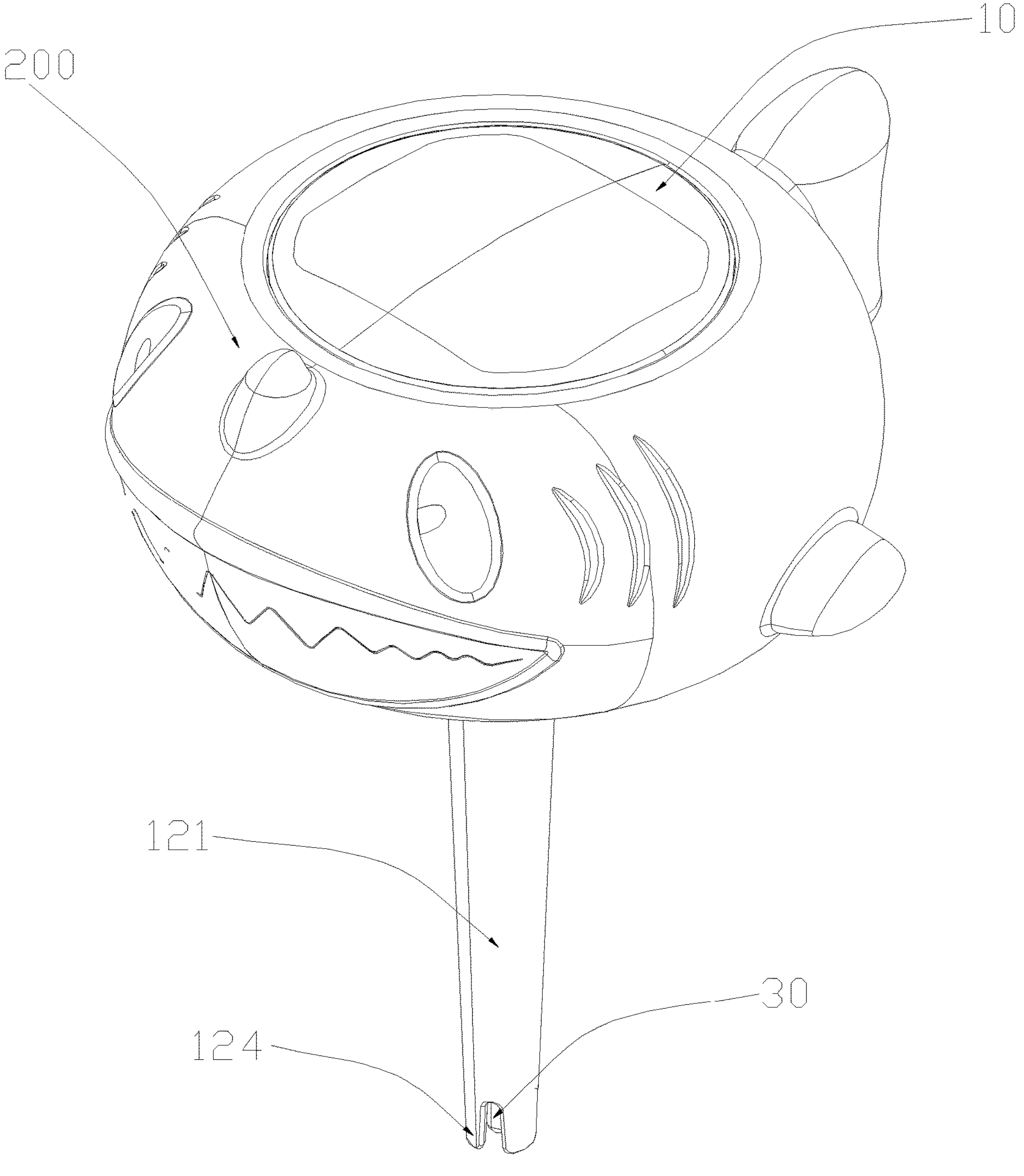
FIG. 13 is a schematic diagram of an entire structure according to a fourth embodiment of the present disclosure.
Figure 14:
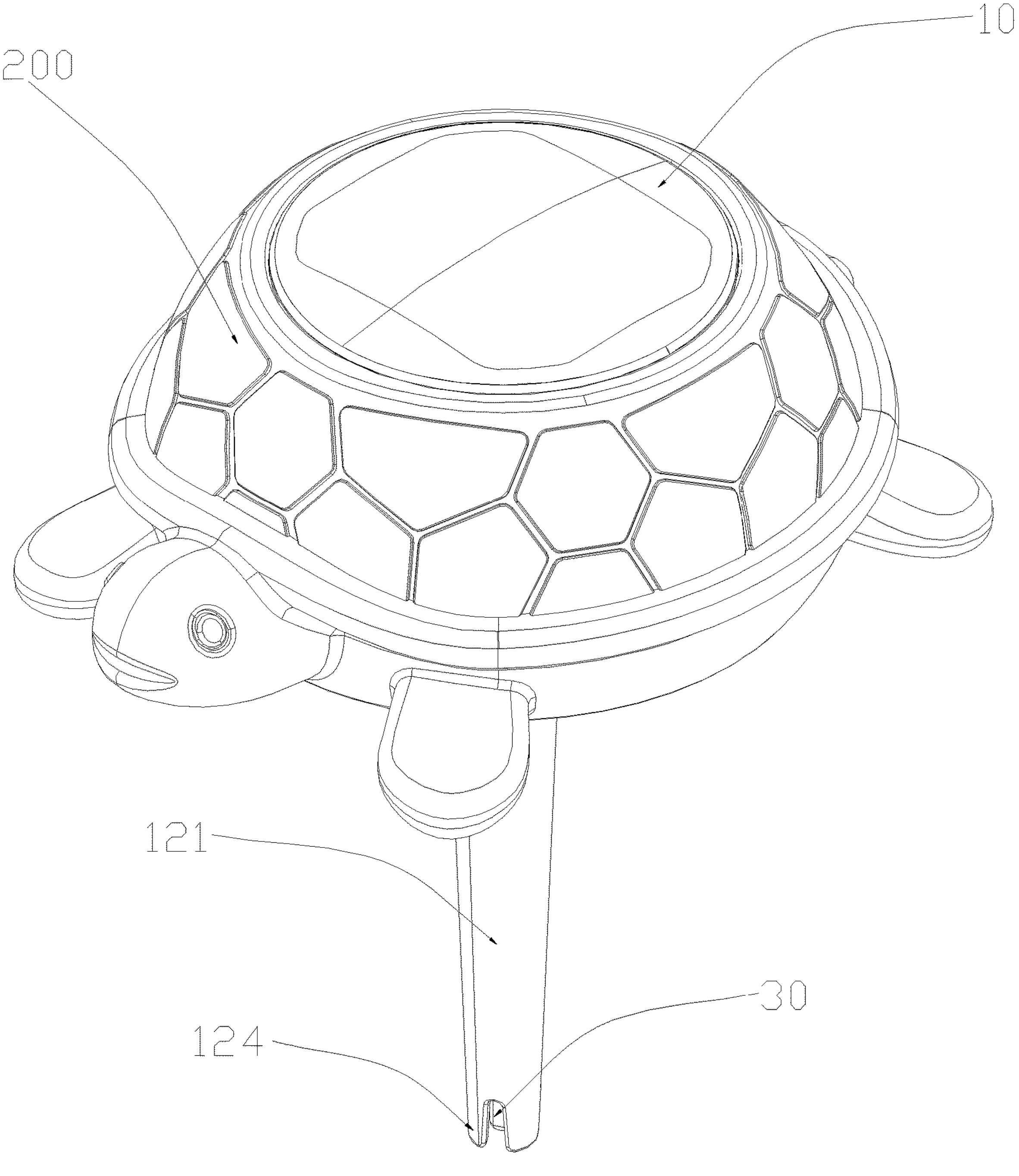
FIG. 14 is a schematic diagram of an entire structure according to a fifth embodiment of the present disclosure.

Referring to FIG. 1 to FIG. 14, a temperature gauge includes:

- a shell 10, wherein an accommodating chamber 101 is arranged in the shell 10; at least a portion of an upper part of the shell 10 is transparent; a control device 20 is arranged inside the accommodating chamber 101; the shell 10 is configured to be detachably connected to a floating shell 200 and floats on a water surface under the action of buoyancy of the floating shell 200;
- a temperature sensing device 30, wherein the temperature sensing device 30 is arranged inside the accommodating chamber 101 and is at least partially threaded out of a bottom of the shell 10; the temperature sensing device 30 is electrically connected to the control device 20; the temperature sensing device 30 is configured to be immersed in water to detect a water temperature to generate an electrical signal and transmit the electrical signal to the control device 20; and
- a display device 40, wherein the display device 40 is arranged inside the accommodating chamber 101; the display device 40 is electrically connected to the control device 20 and faces the transparent portion of the upper part of the shell 10; and the control device 20 receives the electrical signal and controls the display device 40 to display a temperature.

By the arrangement of the above structure, during use, the shell 10 is connected to the floating shell 200. When the two shells are placed in the water, the shell 10 floats on the water surface under the action of the buoyancy of the floating shell 200. Moreover, a user can freely replace the floating shell 200, so that the product has different appearances and is more diverse and aesthetically pleasing. The temperature sensing device 30 is threaded out along the bottom of the shell 10 and is immersed into liquid, which can effectively measure the water temperature and generate the electrical signal. The electrical signal is transmitted to the control device 20. The control device 20 controls the display device 40 to display the temperature, and a display surface of the display device 40 faces the transparent portion of the upper part of the shell 10. The user can observe, through the transparent portion of the upper part of the shell 10, the temperature displayed by the display device 40, making it convenient for the user to read temperature parameters.

In this implementation, the bottom of the shell 10 extends downwards to form a protruding insertion part 121; a tail end of the insertion part 121 is provided with a mounting hole 122 communicated to the accommodating chamber 101; and a detection end of the temperature sensing device 30 is threaded out along the mounting hole 122. By the arrangement of the above structure, the insertion part 121 is conical and extends downwards along the bottom of the shell 10. When the product floats on the water surface, the insertion part can be inserted more deeply into the liquid, and the detected temperature is closer to the temperature of the whole liquid, which improves the detection precision. The detection end of temperature sensing device 30 is threaded out along the mounting hole 122, so that the detection end of temperature sensing device 30 is in direct contact with the water to directly measure the water temperature, thereby improving the detection efficiency and precision of the product.

In this implementation, a limiting block 123 is arranged in the mounting hole 122 in a protruding manner, and an end surface of the detection end face of the temperature sensing device 30 is abutted to the limiting block 123. By the arrangement of the above structure, during assembling of the product, the temperature sensing device 30 is inserted along the mounting hole 122 until the end surface of the detection end of the temperature sensing device 30 is abutted to the limiting block 123. This can limit a mounting position of the temperature sensing device 30, so that the detection end of the temperature sensing device 30 can be exposed out of the shell 10 and in direct contact with the water to directly measure the water temperature. This can effectively improve the detection precision.

In this implementation, the temperature gauge further includes a first sealing ring 50; a first sealing groove 31 is arranged on the end surface of the detection end face of the temperature sensing device 30; the first sealing ring 50 is arranged in the first sealing groove 31; and the limiting block 123 is abutted to a surface of the first sealing ring 50. By the arrangement of the above structure, during use, the first sealing ring 50 is placed inside the first sealing groove 31; the limiting block 123 is abutted to one side of the surface of the first sealing ring 50; and the first sealing groove 31 is abutted to the other side of the surface of the first sealing ring 50. This can effectively achieve sealing between the temperature sensing device 30 and the limiting block 123, improve the sealing performance of the product, and prevent the water from entering the accommodating chamber 101 along a gap between the temperature sensing device 30 and the limiting block 123, thus protecting the safety of electrical components inside the accommodating chamber 101 and prolonging the service life of the product.

In this implementation, protective flaps 124 are arranged at a tail end of the insertion part 121 in a protruding manner, and the protective flaps 124 are arranged around the detection end of the temperature sensing device 30. By the arrangement of the above structure, gaps between the protective flaps 124 can allow the water to freely enter and exit, so that the detection end of the temperature sensing device 30 can be in direct contact with the water, and the detection end of the temperature sensing device 30 can accurately detect the water temperature. Meanwhile, the protective flaps 124 at the tail end of the insertion part 121 surround the detection end of the temperature sensing device 30, which can protect the detection end of the temperature sensing device 30 and prevent collision between the detection end of the temperature sensing device 30 and the outside. This can effectively protect the detection end of the temperature sensing device 30 and improve the safety and service life of the product.

In this implementation, the temperature gauge further includes a second sealing ring 60; the shell 10 includes an upper shell 11 and a lower shell 12; the upper shell 11 is provided with a second sealing groove 111; second sealing ring 60 is inserted into the second sealing groove 111; the lower shell 12 is connected to the upper shell 11 and is abutted to the second sealing ring 60; and the accommodating chamber 101 is formed between the upper shell 11 and the lower shell 12. By the arrangement of the above structure, the upper shell 11 and the lower shell 12 are separately arranged, which can lower the production difficulty, improve the production efficiency, and also facilitate the assembling of the product. In order to ensure the sealing performance of the product, the second sealing groove 111 is arranged on the upper shell 11, and the second sealing ring 60 is inserted into the second sealing groove 111, which can ensure the sealing between the upper shell 11 and the lower shell 12, protect the safety of the electrical components inside the accommodating chamber 101, and prolong the service life of the product.

In this implementation, the temperature gauge further includes a button assembly 70; a button hole 125 is arranged on a lower surface of the shell 10; the button assembly 70 is hermetically inserted into the button hole 125; and the button assembly 70 is electrically connected to the control device 20. By the arrangement of the above structure, when the button assembly 70 is used, human-machine interactions can be achieved. During use, the user can press and touch the button assembly 70 to generate an electrical signal which is transmitted to the control device 20. The control device 20 receives the electrical signal and controls turning on and turning off of the electrical components such as the temperature sensing device 30 and the display device 40 based on the electrical signal. This can effectively control the product and facilitate use.

In this implementation, the button assembly 70 includes a button control board 71 and a silica gel button cap 72; the button control board 71 is connected to the shell 10; an edge of the silica gel button cap 72 is hermetically connected to the shell 10; and a middle part of the silica gel button cap 72 is in contact with an electrical contact on the button control board 71. By the arrangement of the above structure, the edge of the silica gel button cap 72 is hermetically connected to the shell 10, which can isolate the accommodating chamber 101 and an external environment. Furthermore, the silica gel button cap 72 is soft. The user can press the middle part of the silica gel button cap 72, and the silica gel button cap 72 deforms and is in contact with the electrical contact on the key control board 71 to generate the electrical signal to both achieve the human-machine interactions and ensure the sealing performance of the product. The structure is stable.

In this implementation, the temperature gauge further includes a solar panel 80; the solar panel 80 is arranged at a top of the accommodating chamber 101 and faces the transparent portion of the upper part of the shell 10; and the solar panel 80 is electrically connected to the control device 20. By the arrangement of the above structure, when the solar panel 80 is used, solar energy can be converted into electric energy, and the electric energy is stored in a battery after voltage conversion, which can effectively save energy and improve the endurance of the product. Especially for a product used in an outdoor swimming pool, its upper surface can receive ample sunlight, and the solar energy is converted into the electric energy and stored during the day.

In this implementation, an opening 81 is arranged in a middle part of the solar panel 80; and the opening 81 directly faces the display device 40 and is configured to allow light to pass. By the arrangement of the above structure, the user can observe, through the opening 81, temperature data displayed on the display device 40. This facilitates observation by the user.

In this implementation, the temperature gauge further includes a supporting shell 13; the supporting shell 13 is arranged inside the accommodating chamber 101; the control device 20 is connected to the supporting shell 13; and the solar panel 80 is arranged on an upper surface of the supporting shell 13. By the arrangement of the above structure, the supporting shell 13 can effectively fix the electrical components such as the control device 20, the solar panel 80, and the display device 40, so as to improve the stability of the product, making the product assembled more conveniently and have longer service life.

In this implementation, the temperature gauge further includes a battery 90; and the battery 90 is arranged at the middle part of the accommodating chamber 101 and is electrically connected to the control device 20. By the arrangement of the above structure, the battery 90 can improve the endurance of the product. By cooperation with the solar panel 80, clean energy can be used, so that the product is energy-saving and environmentally friendly.

In this implementation, a threading hole 126 is further arranged on a surface of the lower shell 12, and the threading hole 126 is configured to allow a wire body to pass. By the arrangement of the above structure, during use, a connector can be threaded through the threading hole 126 to fix the product in a region inside a swimming pool, which prevents the product from moving with a water flow and ensures the stability of measurement of the product.

In this implementation, the temperature gauge further includes a counterweight block 127, and the counterweight block 127 is arranged on a bottom wall of the accommodating chamber 101. By the arrangement of the above structure, the counterweight block 127 can lower a center of gravity of the product, so that the product is more stable. Combined with the floating shell 200, the product can float more stably on the water surface.

Referring to FIG. 1 to FIG. 14, a temperature gauge with a floating shell includes:

- a floating shell 200, wherein the floating shell 200 is provided with a sealed floating chamber 201 and an insertion space 202;
- a shell 10, wherein an accommodating chamber 101 is arranged in the shell 10; at least a portion of an upper part of the shell 10 is transparent; a control device 20 is arranged inside the accommodating chamber 101; the shell 10 is configured to be detachably connected and inserted to the insertion space 202 and floats on a water surface under the action of buoyancy of the floating shell 200;

a temperature sensing device 30, wherein the temperature sensing device 30 is arranged inside the accommodating chamber 101 and is at least partially threaded out of a bottom of the shell 10; the temperature sensing device 30 is electrically connected to the control device 20; the temperature sensing device 30 is configured to be immersed in water to detect a water temperature to generate an electrical signal and transmit the electrical signal to the control device 20; and a display device 40, wherein the display device 40 is arranged inside the accommodating chamber 101; the display device 40 is electrically connected to the control device 20 and faces the transparent portion of the upper part of the shell 10; and the control device 20 receives the electrical signal and controls the display device 40 to display a temperature.

By the arrangement of the above structure, during use, the shell 10 is inserted into the insertion space 202 of the floating shell 200. When the two shells are placed in the water, the shell 10 floats on the water surface under the action of the buoyancy of the floating chamber 201. Moreover, a user can freely replace the floating shell 200, so that the product has different appearances and is more diverse and aesthetically pleasing. The temperature sensing device 30 is threaded out along the bottom of the shell 10 and is immersed into liquid, which can effectively measure the water temperature and generate the electrical signal. The electrical signal is transmitted to the control device 20. The control device 20 controls the display device 40 to display the temperature, and a display surface of the display device 40 faces the transparent portion of the upper part of the shell 10. The user can observe, through the transparent portion of the upper part of the shell 10, the temperature displayed by the display device 40, making it convenient for the user to read temperature parameters. A limiting block is arranged at a bottom of the insertion space 202; a limiting boss is arranged at an edge of the bottom of the shell 10; and the limiting block is abutted to the limiting boss, which can effectively fix the floating shell 200 and the shell 10 and improve the stability of the product.

In this implementation, the bottom of the shell 10 extends downwards to form a protruding insertion part 121; a tail end of the insertion part 121 is provided with a mounting hole 122 communicated to the accommodating chamber 101; and a detection end of the temperature sensing device 30 is threaded out along the mounting hole 122. By the arrangement of the above structure, the insertion part 121 is conical and extends downwards along the bottom of the shell 10. When the product floats on the water surface, the insertion part can be inserted more deeply into the liquid, and the detected temperature is closer to the temperature of the whole liquid, which improves the detection precision. The detection end of temperature sensing device 30 is threaded out along the mounting hole 122, so that the detection end of temperature sensing device 30 is in direct contact with the water to directly measure the water temperature, thereby improving the detection efficiency and precision of the product.

In this implementation, a limiting block 123 is arranged in the mounting hole 122 in a protruding manner, and an end surface of the detection end face of the temperature sensing device 30 is abutted to the limiting block 123. By the arrangement of the above structure, during assembling of the product, the temperature sensing device 30 is inserted along the mounting hole 122 until the end surface of the detection end of the temperature sensing device 30 is abutted to the limiting block 123. This can limit a mounting position of the temperature sensing device 30, so that the detection end of the temperature sensing device 30 can be exposed out of the shell 10 and in direct contact with the water to directly measure the water temperature. This can effectively improve the detection precision.

In this implementation, the temperature gauge further includes a first sealing ring 50; a first sealing groove 31 is arranged on the end surface of the detection end face of the temperature sensing device 30; the first sealing ring 50 is arranged in the first sealing groove 31; and the limiting block 123 is abutted to a surface of the first sealing ring 50. By the arrangement of the above structure, during use, the first sealing ring 50 is placed inside the first sealing groove 31; the limiting block 123 is abutted to one side of the surface of the first sealing ring 50; and the first sealing groove 31 is abutted to the other side of the surface of the first sealing ring 50. This can effectively achieve sealing between the temperature sensing device 30 and the limiting block 123, improve the sealing performance of the product, and prevent the water from entering the accommodating chamber 101 along a gap between the temperature sensing device 30 and the limiting block 123, thus protecting the safety of electrical components inside the accommodating chamber 101 and prolonging the service life of the product.

In this implementation, protective flaps 124 are arranged at a tail end of the insertion part 121 in a protruding manner, and the protective flaps 124 are arranged around the detection end of the temperature sensing device 30. By the arrangement of the above structure, gaps between the protective flaps 124 can allow the water to freely enter and exit, so that the detection end of the temperature sensing device 30 can be in direct contact with the water, and the detection end of the temperature sensing device 30 can accurately detect the water temperature. Meanwhile, the protective flaps 124 at the tail end of the insertion part 121 surround the detection end of the temperature sensing device 30, which can protect the detection end of the temperature sensing device 30 and prevent collision between the detection end of the temperature sensing device 30 and the outside. This can effectively protect the detection end of the temperature sensing device 30 and improve the safety and service life of the product.

In this implementation, the temperature gauge further includes a second sealing ring 60; the shell 10 includes an upper shell 11 and a lower shell 12; the upper shell 11 is provided with a second sealing groove 111; second sealing ring 60 is inserted into the second sealing groove 111; the lower shell 12 is connected to the upper shell 11 and is abutted to the second sealing ring 60; and the accommodating chamber 101 is formed between the upper shell 11 and the lower shell 12. By the arrangement of the above structure, the upper shell 11 and the lower shell 12 are separately arranged, which can lower the production difficulty, improve the production efficiency, and also facilitate the assembling of the product. In order to ensure the sealing performance of the product, the second sealing groove 111 is arranged on the upper shell 11, and the second sealing ring 60 is inserted into the second sealing groove 111, which can ensure the sealing between the upper shell 11 and the lower shell 12, protect the safety of the electrical components inside the accommodating chamber 101, and prolong the service life of the product.

In this implementation, the temperature gauge further includes a button assembly 70; a button hole 125 is arranged on a lower surface of the shell 10; the button assembly 70 is hermetically inserted into the button hole 125; and the button assembly 70 is electrically connected to the control device 20. By the arrangement of the above structure, when the button assembly 70 is used, human-machine interactions can be achieved. During use, the user can press and touch the button assembly 70 to generate an electrical signal which is transmitted to the control device 20. The control device 20 receives the electrical signal and controls turning on and turning off of the electrical components such as the temperature sensing device 30 and the display device 40 based on the electrical signal. This can effectively control the product and facilitate use.

In this implementation, the button assembly 70 includes a button control board 71 and a silica gel button cap 72; the button control board 71 is connected to the shell 10; an edge of the silica gel button cap 72 is hermetically connected to the shell 10; and a middle part of the silica gel button cap 72 is in contact with an electrical contact on the button control board 71. By the arrangement of the above structure, the edge of the silica gel button cap 72 is hermetically connected to the shell 10, which can isolate the accommodating chamber 101 and an external environment. Furthermore, the silica gel button cap 72 is soft. The user can press the middle part of the silica gel button cap 72, and the silica gel button cap 72 deforms and is in contact with the electrical contact on the key control board 71 to generate the electrical signal to both achieve the human-machine interactions and ensure the sealing performance of the product. The structure is stable.

In this implementation, the temperature gauge further includes a solar panel 80; the solar panel 80 is arranged at a top of the accommodating chamber 101 and faces the transparent portion of the upper part of the shell 10; and the solar panel 80 is electrically connected to the control device 20. By the arrangement of the above structure, when the solar panel 80 is used, solar energy can be converted into electric energy, and the electric energy is stored in a battery after voltage conversion, which can effectively save energy and improve the endurance of the product. Especially for a product used in an outdoor swimming pool, its upper surface can receive ample sunlight, and the solar energy is converted into the electric energy and stored during the day.

In this implementation, an opening 81 is arranged in a middle part of the solar panel 80; and the opening 81 directly faces the display device 40 and is configured to allow light to pass. By the arrangement of the above structure, the user can observe, through the opening 81, temperature data displayed on the display device 40. This facilitates observation by the user.

In this implementation, the temperature gauge further includes a supporting shell 13; the supporting shell 13 is arranged inside the accommodating chamber 101; the control device 20 is connected to the supporting shell 13; and the solar panel 80 is arranged on an upper surface of the supporting shell 13. By the arrangement of the above structure, the supporting shell 13 can effectively fix the electrical components such as the control device 20, the solar panel 80, and the display device 40, so as to improve the stability of the product, making the product assembled more conveniently and have longer service life.

In this implementation, the temperature gauge further includes a battery 90; and the battery 90 is arranged at the middle part of the accommodating chamber 101 and is electrically connected to the control device 20. By the arrangement of the above structure, the battery 90 can improve the endurance of the product. By cooperation with the solar panel 80, clean energy can be used, so that the product is energy-saving and environmentally friendly.

In this implementation, a threading hole 126 is further arranged on a surface of the lower shell 12, and the threading hole 126 is configured to allow a wire body to pass. By the arrangement of the above structure, during use, a connector can be threaded through the threading hole 126 to fix the product in a region inside a swimming pool, which prevents the product from moving with a water flow and ensures the stability of measurement of the product.

In this implementation, the temperature gauge further includes a counterweight block 127, and the counterweight block 127 is arranged on a bottom wall of the accommodating chamber 101. By the arrangement of the above structure, the counterweight block 127 can lower a center of gravity of the product, so that the product is more stable. Combined with the floating shell 200, the product can float more stably on the water surface.

One or more implementation modes are provided above in combination with specific contents, and it is not deemed that the specific implementation of the present disclosure is limited to these specifications. Any technical deductions or replacements approximate or similar to the method and structure of the present disclosure or made under the concept of the present disclosure shall fall within the scope of protection of the present disclosure.

One or more implementation modes are provided above in combination with specific contents, and it is not deemed that the specific implementation of the present disclosure is limited to these specifications. Any technical deductions or replacements approximate or similar to the method and structure of the present disclosure or made under the concept of the present disclosure shall fall within the scope of protection of the present disclosure.

What is claimed is:

1. A temperature gauge, comprising:

a shell, wherein an accommodating chamber is arranged in the shell; at least a portion of an upper part of the shell is transparent; a control device is arranged inside the accommodating chamber; and the shell is configured to be detachably connected to a floating shell and floats on a water surface under the action of buoyancy of the floating shell;

a temperature sensing device, wherein the temperature sensing device is arranged inside the accommodating chamber and is at least partially threaded out of a bottom of the shell; the temperature sensing device is electrically connected to the control device; and the temperature sensing device is configured to be immersed in the water to detect a water temperature to generate an electrical signal and transmit the electrical signal to the control device;

a display device, wherein the display device is arranged inside the accommodating chamber; the display device is electrically connected to the control device and faces the transparent portion of the upper part of the shell; and the control device receives the electrical signal and controls the display device to display a temperature; and a solar panel, wherein an opening is arranged in a middle part of the solar panel; and the opening directly faces the display device and is configured to allow light to pass.

2. The temperature gauge according to claim 1, wherein the solar panel is arranged at a top of the accommodating chamber and faces the transparent portion of the upper part of the shell;

and the solar panel is electrically connected to the control device.

3. The temperature gauge according to claim 1, further comprising a button assembly, wherein a button hole is arranged on a lower surface of the shell; the button assembly is hermetically inserted into the button hole; and the button assembly is electrically connected to the control device.

4. The temperature gauge according to claim 3, wherein the button assembly comprises a button control board and a silica gel button cap; the button control board is connected to the shell; an edge of the silica gel button cap is hermetically connected to the shell; and a middle part of the silica gel button cap is in contact with an electrical contact on the button control board.

5. The temperature gauge according to claim 1, wherein the bottom of the shell extends downwards to form a protruding insertion part; a tail end of the insertion part is provided with a mounting hole communicated to the accommodating chamber; and a detection end of the temperature sensing device is threaded out along the mounting hole.

6. The temperature gauge according to claim 5, wherein protective flaps are arranged at a tail end of the insertion part in a protruding manner, and the protective flaps are arranged around the detection end of the temperature sensing device.

7. The temperature gauge according to claim 5, wherein a limiting block is arranged in the mounting hole in a protruding manner, and an end surface of the detection end of the temperature sensing device is abutted to the limiting block.

8. The temperature gauge according to claim 7, further comprising a first sealing ring, wherein a first sealing groove is arranged on the end surface of the detection end face of the temperature sensing device; the first sealing ring is arranged in the first sealing groove; and the limiting block is abutted to a surface of the first sealing ring.

9. The temperature gauge according to claim 8, further comprising a second sealing ring, wherein the shell comprises an upper shell and a lower shell; the upper shell is provided with a second sealing groove; the second sealing ring is inserted into the second sealing groove; the lower shell is connected to the upper shell and is abutted to the second sealing ring; and the accommodating chamber is formed between the upper shell and the lower shell.

10. A temperature gauge with a floating shell, comprising:

a floating shell, wherein the floating shell is provided with a sealed floating chamber and an insertion space;

a shell, wherein an accommodating chamber is arranged in the shell; at least a portion of an upper part of the shell is transparent; a control device is arranged inside the accommodating chamber; and the shell is configured to be detachably connected and inserted to the insertion space and floats on a water surface under the action of buoyancy of the floating shell;

a temperature sensing device, wherein the temperature sensing device is arranged inside the accommodating chamber and is at least partially threaded out of a bottom of the shell; the temperature sensing device is electrically connected to the control device;

and the temperature sensing device is configured to be immersed in the water to detect a water temperature to generate an electrical signal and transmit the electrical signal to the control device; a display device, wherein the display device is arranged inside the accommodating chamber; the display device is electrically connected to the control device and faces the transparent portion of the upper part of the shell; and the control device receives the electrical signal and controls the display device to display a temperature; and a solar panel, wherein an opening is arranged in a middle part of the solar panel; and the opening directly faces the display device and is configured to allow light to pass.

11. The temperature gauge with the floating shell according to claim 10, wherein the solar panel is located at a top of the accommodating chamber and faces the transparent portion of the upper part of the shell; and the solar panel is electrically connected to the control device.

12. The temperature gauge with the floating shell according to claim 10, further comprising a button assembly, wherein a button hole is arranged on a lower surface of the shell; the button assembly is hermetically inserted into the button hole; and the button assembly is electrically connected to the control device.

13. The temperature gauge with the floating shell according to claim 12, wherein the button assembly comprises a button control board and a silica gel button cap; the button control board is connected to the shell; an edge of the silica gel button cap is hermetically connected to the shell; and a middle part of the silica gel button cap is in contact with an electrical contact on the button control board.

14. The temperature gauge with the floating shell according to claim 10, wherein the bottom of the shell extends downwards to form a protruding insertion part; a tail end of the insertion part is provided with a mounting hole communicated to the accommodating chamber; and a detection end of the temperature sensing device is threaded out along the mounting hole.

15. The temperature gauge with the floating shell according to claim 14, wherein a protective flap is arranged at a tail end of the insertion part in a protruding manner, and the protective flap is arranged around the detection end of the temperature sensing device.

16. The temperature gauge with the floating shell according to claim 14, wherein a limiting block is arranged in the mounting hole in a protruding manner, and an end surface of the detection end of the temperature sensing device is abutted to the limiting block.

17. The temperature gauge with the floating shell according to claim 16, further comprising a first sealing ring, wherein a first sealing groove is arranged on the end surface of the detection end face of the temperature sensing device; the first sealing ring is arranged in the first sealing groove; and the limiting block is abutted to a surface of the first sealing ring.

18. The temperature gauge with the floating shell according to claim 17, further comprising a second sealing ring, wherein the shell comprises an upper shell and a lower shell; the upper shell is provided with a second sealing groove; the second sealing ring is inserted into the second sealing groove; the lower shell is connected to the upper shell and is abutted to the second sealing ring; and the accommodating chamber is formed between the upper shell and the lower shell.

* * * * *